US010563820B2

(12) United States Patent
Nagura et al.

(10) Patent No.: US 10,563,820 B2
(45) Date of Patent: Feb. 18, 2020

(54) GAS SUPPLY DEVICE, HYDROGEN STATION, AND GAS SUPPLY METHOD

(71) Applicant: Kobe Steel, Ltd., Kobe (JP)

(72) Inventors: Kenji Nagura, Takasago (JP); Hitoshi Takagi, Takasago (JP); Takuro Uba, Takasago (JP)

(73) Assignee: Kobe Steel, Ltd., Kobe-shi (JP)

(*) Notice: Subject to any disclaimer, the term of this patent is extended or adjusted under 35 U.S.C. 154(b) by 23 days.

(21) Appl. No.: 15/118,577

(22) PCT Filed: Jan. 21, 2015

(86) PCT No.: PCT/JP2015/051470
§ 371 (c)(1),
(2) Date: Aug. 12, 2016

(87) PCT Pub. No.: WO2015/122247
PCT Pub. Date: Aug. 20, 2015

(65) Prior Publication Data
US 2017/0051875 A1    Feb. 23, 2017

(30) Foreign Application Priority Data

Feb. 14, 2014    (JP) ................................. 2014-026433

(51) Int. Cl.
*F17C 5/06*    (2006.01)

(52) U.S. Cl.
CPC ........ *F17C 5/06* (2013.01); *F17C 2205/0326* (2013.01); *F17C 2221/012* (2013.01);
(Continued)

(58) Field of Classification Search
CPC ............... F17C 5/06; F17C 2223/0123; F17C 2225/0123; F17C 2250/01;
(Continued)

(56) References Cited

U.S. PATENT DOCUMENTS 4,527,600 A * 7/1985 Fisher ...................... B67D 7/08
141/4
5,385,176 A * 1/1995 Price ........................ F17C 5/06
141/1
(Continued)

FOREIGN PATENT DOCUMENTS

DE    196 50 999 C1    6/1998
JP    8-100888 A    4/1996
(Continued)

OTHER PUBLICATIONS

English machine translation of JP 2013-040648.*
(Continued)

*Primary Examiner* — Andrew D StClair
(74) *Attorney, Agent, or Firm* — Oblon, McClelland, Maier & Neustadt, L.L.P.

(57) ABSTRACT

A gas supply device includes a first compressor that compresses hydrogen gas, an accumulator disposed downstream of the first compressor and supplying the hydrogen gas to a dispenser that fills the hydrogen gas in a vehicle, and a gas flow passage that connects the first compressor, the accumulator, and the dispenser, and a control device. The gas flow passage includes a lead-in line for leading the hydrogen gas into the accumulator, a lead-out line for leading out the hydrogen gas from the accumulator, a lead-in side valve, and a lead-out side valve. The control device is capable of simultaneously bringing the lead-in side valve and the lead-out side valve into an open state.

14 Claims, 5 Drawing Sheets

(52) U.S. Cl.
CPC .............. *F17C 2223/0123* (2013.01); *F17C 2223/036* (2013.01); *F17C 2225/0123* (2013.01); *F17C 2225/036* (2013.01); *F17C 2227/0164* (2013.01); *F17C 2227/0185* (2013.01); *F17C 2250/01* (2013.01); *F17C 2260/025* (2013.01); *F17C 2265/063* (2013.01); *F17C 2265/065* (2013.01); *F17C 2270/0178* (2013.01); *F17C 2270/0184* (2013.01); *Y02E 60/321* (2013.01); *Y02P 90/45* (2015.11)

(58) Field of Classification Search
CPC .......... F17C 2265/063; F17C 2265/065; F15B 1/04; F15B 1/045; F15B 1/048; F15B 1/08; F15B 1/083; F15B 1/086; F15B 1/10; F15B 1/103; F15B 1/106; F15B 1/12; F15B 1/125; F15B 1/14; F15B 1/16; F15B 1/165; F15B 1/18; F15B 1/20; F15B 1/22; F15B 1/24
See application file for complete search history.

(56) References Cited

U.S. PATENT DOCUMENTS

| | | | |
|---|---|---|---|
| 7,287,558 B2 | 10/2007 | Hobbs | |
| 8,281,820 B2 * | 10/2012 | White | F17C 5/02 141/37 |
| 9,765,930 B2 * | 9/2017 | Poorman | F17C 5/02 |
| 2008/0005964 A1 * | 1/2008 | Hajiaghajani | C01B 3/382 48/61 |
| 2009/0151812 A1 * | 6/2009 | Allidieres | F17C 5/007 141/11 |
| 2012/0318403 A1 * | 12/2012 | Cohen | F17C 7/02 141/3 |
| 2013/0240080 A1 | 9/2013 | Pick et al. | |
| 2014/0196814 A1 * | 7/2014 | Nagura | F17C 5/007 141/82 |
| 2014/0202585 A1 * | 7/2014 | Barker | F17C 5/06 141/4 |
| 2014/0332114 A1 | 11/2014 | Nagura et al. | |

FOREIGN PATENT DOCUMENTS

| | | | | |
|---|---|---|---|---|
| JP | 8-109999 A | 4/1996 | | |
| JP | 2003-172497 A | 6/2003 | | |
| JP | 2011-74925 A | 4/2011 | | |
| JP | WO 2012147340 A1 * | 11/2012 | ............. | F17C 5/007 |
| JP | 2013-15155 A | 1/2013 | | |
| JP | 2013-40648 A | 2/2013 | | |
| JP | 2013-130218 A | 7/2013 | | |
| JP | 2013-130278 A | 7/2013 | | |
| WO | 2014/084243 A1 | 6/2014 | | |

OTHER PUBLICATIONS

English machine translation of JP 2011-074925.*
International Search Report dated Apr. 28, 2015 in PCT/JP2015/051470, filed Jan. 21, 2015.
International Preliminary Report on Patentability and Written Opinion dated Aug. 25, 2016 in PCT/JP2015/051470 (submitting English language translation only).

* cited by examiner

GAS SUPPLY DEVICE, HYDROGEN STATION, AND GAS SUPPLY METHOD

TECHNICAL FIELD

The present invention relates to a gas supply device, a hydrogen station, and a gas supply method.

BACKGROUND ART

There has been known a gas supply device that temporarily stores gas supplied from a hydrogen producing device and supplies the stored gas to a gas dispenser as disclosed in Patent Literature 1 described below. Specifically, in the gas supply device of this type, a hydrogen compressor and an accumulator are provided in a pipe. The gas led in from the hydrogen producing device is compressed by the hydrogen compressor, and the gas compressed by the hydrogen compressor is stored in the accumulator. The gas stored in the accumulator is supplied to the dispenser according to a pressure difference between a gas pressure in the accumulator and a gas pressure on the dispenser side (differential pressure filling operation). Therefore, during the differential pressure filling operation, the gas pressure in the accumulator gradually drops. If the gas pressure in the accumulator is low after the differential pressure filling operation, the gas pressure in the accumulator can be recovered by performing storing operation.

There are the following problems in the configuration for performing the storing operation after the differential pressure filling operation to recover the gas pressure in the accumulator. When a supply command from the dispenser is frequently issued or when the number of accumulators is small, the gas in the accumulator is consumed in a short period. Since the gas pressure in the accumulator greatly drops, it takes time to return the gas pressure in the accumulator to a set pressure. Hydrogen filling in a vehicle cannot be quickly resumed.

CITATION LIST

Patent Literature
    Patent Literature 1: Japanese Unexamined Patent Publication No. 2013-40648

SUMMARY OF INVENTION

An object of the present invention is to suppress a gas pressure in an accumulator from dropping.

A gas supply device according to an aspect of the present invention includes: a compressor that compresses gas; an accumulator disposed downstream of the compressor and supplying the gas to filling equipment that fills the gas in a tank mounting device; and a gas flow passage that connects the compressor, the accumulator, and the filling equipment. The gas flow passage includes: a lead-in line for leading the gas from the compressor into the accumulator; a lead-out line for leading out the gas from the accumulator to the filling equipment; a lead-in side valve provided in the lead-in line; and a lead-out side valve provided in the lead-out line. The gas supply device further includes a control device that controls opening and closing of the lead-in side valve and the lead-out side valve. The control device is configured to be capable of simultaneously bringing the lead-in side valve and the lead-out side valve into an open state.

DESCRIPTION OF EMBODIMENTS

A mode for carrying out the present invention is explained in detail below with reference to the drawings.

Figure 1:
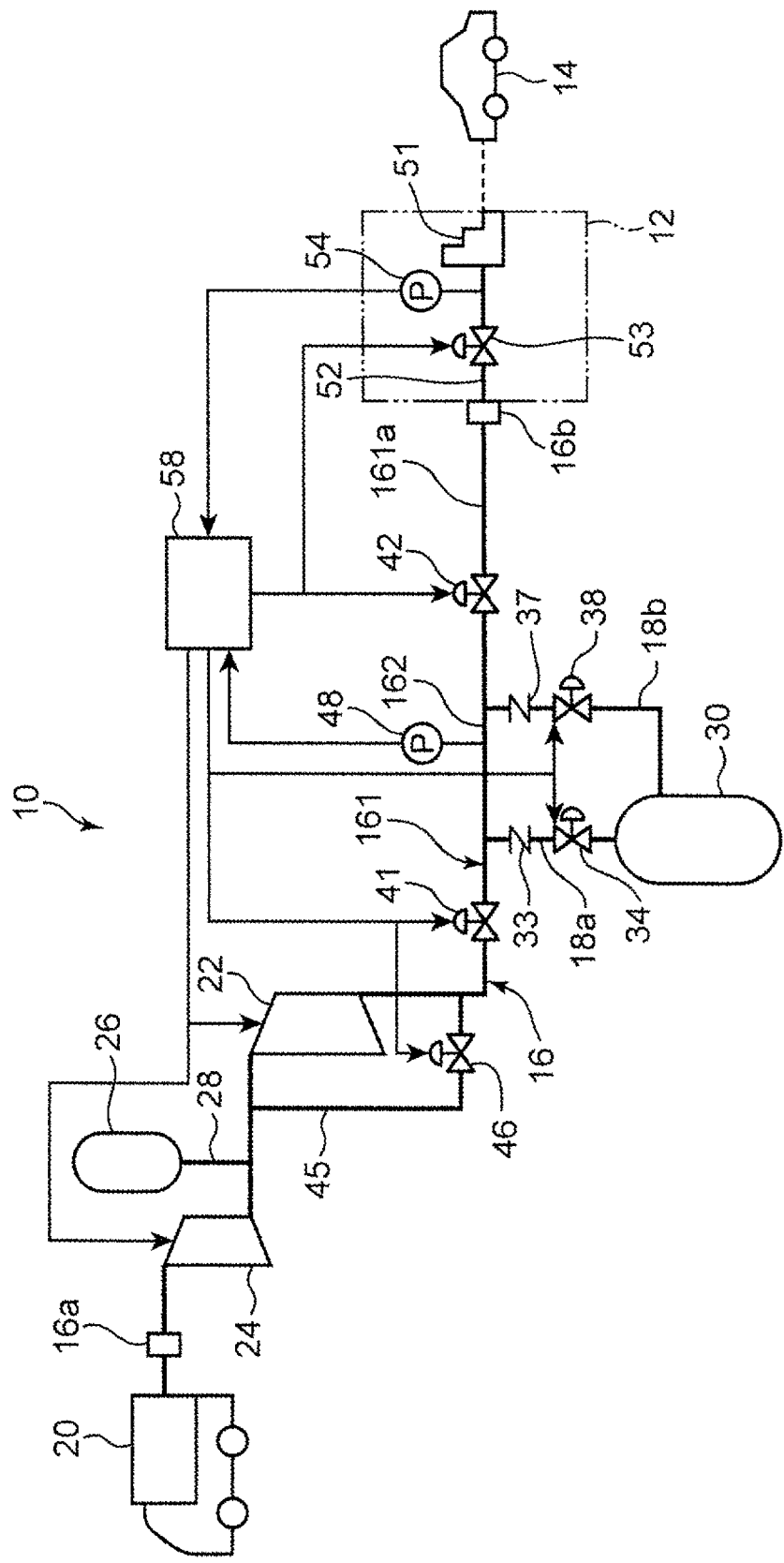
FIG. 1 is a diagram schematically showing the overall configuration of a gas supply device according to an embodiment of the present invention.

As shown in FIG. 1, a gas supply device 10 according to this embodiment is provided in, for example, a hydrogen station functioning as a fueling stand of hydrogen gas. According to a filling command from a dispenser 12, which is filling equipment, the gas supply device 10 supplies the hydrogen gas to the dispenser 12 side. That is, the hydrogen station includes the gas supply device 10 and the dispenser 12 connected to an outflow end of the gas supply device 10. The dispenser 12 fills the hydrogen gas in a tank provided in a vehicle 14 (a tank mounting device). The vehicle 14 is, for example, a fuel-cell vehicle.

The gas supply device 10 includes a first compressor 22, a second compressor 24, a storage tank 26, an accumulator 30, a gas flow passage 16, and a controller 58 (a control device). The gas flow passage 16 includes a main channel 161 and a short-circuit passage 162. The main channel 161 connects a gas supply source 20, the second compressor 24, the first compressor 22, the accumulator 30, and the dispenser 12. The short-circuit passage 162 connects the first compressor 22 and the dispenser 12 not through the accumulator 30. An inflow end 16a, to which the gas supply source 20 is connectable, is provided at an upstream end of the main channel 161. An outflow end 16b, to which the dispenser 12 is connectable, is provided at a downstream end of the main channel 161.

The first compressor 22 is configured by a reciprocating compressor that rotates a not-shown crankshaft with driving of a not-shown motor to reciprocatingly move a piston. In the first compressor 22, a not-shown discharge valve opens and the hydrogen gas is discharged when the hydrogen gas is compressed and the pressure in a cylinder (a compression chamber) rises to be equal to or higher than the pressure in the gas flow passage 16 on a discharge side. Note that the first compressor 22 is not limited to the reciprocating compressor and may be configured by a compressor of a type other than the reciprocating compressor.

The second compressor 24 is disposed further on the upstream side than the first compressor 22 in the main channel 161. A small compressor having a compression capacity smaller than the compression capacity of the first compressor 22 may be used as the second compressor 24. The storage tank 26 is connected to the gas flow passage 16 through a connection passage 28 connected to a part between the second compressor 24 and the first compressor 22 in the main channel 161. In the gas supply device 10, the hydrogen gas having low pressure in the gas supply source 20 is compressed by the second compressor 24. The gas discharged from the second compressor 24 is stored in the storage tank 26. The hydrogen gas in the storage tank 26 is sucked by the first compressor 22. Note that, actually, not-shown various valves are provided between the storage tank 26 and the first compressor 22 and between the storage tank 26 and the second compressor 24. Lead-in of the hydrogen gas into the storage tank 26 and lead-out of the hydrogen gas from the storage tank 26 are controlled.

The accumulator 30 is provided in a part between the first compressor 22 and the outflow end 16*b* in the main channel 161. The accumulator 30 is a component for temporarily storing the hydrogen gas. The accumulator 30 stores the hydrogen gas compressed by the first compressor 22. The hydrogen gas is filled in the accumulator 30 in advance by the first compressor 22. The pressure in the accumulator 30 is a set pressure (e.g., 82 MPa). In FIG. 1, one accumulator 30 is provided. However, two or more accumulators 30 may be provided.

In the following explanation, a part for leading the hydrogen gas from the first compressor 22 into the accumulator 30 located on the downstream side of the first compressor 22 in the main channel 161 is referred to as "lead-in line 18*a*". A part for leading out the hydrogen gas from the accumulator 30 to the dispenser 12 is referred to as "lead-out line 18*b*". In the lead-in line 18*a*, a check valve 33, a lead-in side valve 34, which is a valve member on a lead-in side, and a first on-off valve 41 are provided. The lead-in side valve 34 is configured by an air driving valve that performs only switching of an opening degree. The check valve 33 allows only a flow toward the accumulator 30 and blocks a flow in a flowing out direction from the accumulator 30. Note that the lead-in side valve 34 may be a valve other than the air driving valve. The first on-off valve 41 is disposed between the first compressor 22 and the check valve 33/the lead-in side valve 34.

In the lead-out line 18*b*, a check valve 37, a lead-out side valve 38, which is a valve member on a lead-out side, and a second on-off valve 42 are provided. The lead-out side valve 38 is configured by an air driving valve. The check valve 37 allows a flow in a flowing out direction from the accumulator 30 and blocks a flow toward the accumulator 30. The second on-off valve 42 is disposed between the dispenser 12 and the check valve 37/the lead-out side valve 38.

The short-circuit passage 162 of the gas flow passage 16 short-circuits a part between the first on-off valve 41 and the check valve 33/the lead-in side valve 34 of the lead-in line 18*a* and a part between the second on-off valve 42 and the check valve 37/the lead-out side valve 38 of the lead-out line 18*b*.

A return channel 45 is connected to the gas flow passage 16. One end portion of the return channel 45 is connected to a part between a discharge section of the first compressor 22 and the first on-off valve 41. The other end portion of the return channel 45 is connected to a part between a suction section of the first compressor 22 and a connection place of the connection passage 28. A return valve 46 is provided in the return channel 45. When the return valve 46 is opened, a part or the entire hydrogen gas discharged from the first compressor 22 is returned to the upstream side of the first compressor 22.

The gas supply device 10 includes a first pressure sensor 48, which is a pressure detecting section. The first pressure sensor 48 is disposed in the short-circuit passage 162. The pressure of the hydrogen gas measured by the first pressure sensor 48 is equivalent to the pressure in the accumulator 30.

The controller 58 controls driving of the first compressor 22 and the second compressor 24 and controls opening and closing of the first on-off valve 41, the second on-off valve 42, the lead-in side valve 34, the lead-out side valve 38, and the return valve 46.

In the dispenser 12, an adapter 51, a supply passage 52 that connects the adapter 51 and the outflow end 16*b* of the gas flow passage 16, a flow-rate control valve 53 provided in the supply passage 52, and a second pressure sensor 54, which is a pressure detecting section, are provided. The adapter 51 is attached to a gas supply port of the vehicle 14 when the hydrogen gas is supplied. The flow-rate control valve 53 is configured by an air driving valve. Note that a flow-rate control valve other than the air driving valve may be used. A not-shown controller is provided in the dispenser 12. The controller controls an opening degree of the flow-rate control valve 53 on the basis of a detection value of the second pressure sensor 54. In the following explanation, a region downstream of the flow-rate control valve 53 of the dispenser 12 and the vehicle 14 are collectively referred to as "demand section".

In the gas supply device 10, the first compressor 22 and the accumulator 30 are connected in series in the main channel 161. The lead-in side valve 34 and the lead-out side valve 38 are opened, whereby the gas supply device 10 is brought into a state in which the hydrogen gas can be lead into the accumulator 30 from the first compressor 22 via the lead-in line 18*a* and a state in which the hydrogen gas can be lead out to the dispenser 12 from the accumulator 30 via the lead-out line 18*b*. In the following explanation, an operation mode of the gas supply device 10 for enabling both of lead-in of the hydrogen gas into the accumulator 30 and lead-out of the hydrogen gas from the accumulator 30 is referred to as "series differential pressure filling operation". That is, the controller 58 is capable of executing an operation mode for simultaneously bringing the lead-in side valve 34 and the lead-out side valve 38 into an open state and leading out the hydrogen gas from the accumulator 30 while leading the hydrogen gas into the accumulator 30.

Further, the gas supply device 10 is connected to the dispenser 12 via the short-circuit passage 162 (i.e., not through the accumulator 30). Therefore, the gas supply device 10 can directly deliver the entire amount of the hydrogen gas, which is discharged from the first compressor 22, to the dispenser 12 by closing the lead-in side valve 34 and the lead-out side valve 38. In the following explanation, an operation mode of the gas supply device 10 for delivering the hydrogen gas from the first compressor 22 to the dispenser 12 without intervention of the accumulator 30 is referred to as "direct filling operation". That is, the controller 58 is capable of executing an operation mode for driving the first compressor 22 in a state in which the lead-in side valve 34 and the lead-out side valve 38 are simultaneously closed.

The gas supply device 10 can also perform operation for supplying the hydrogen gas from the accumulator 30 to the dispenser 12 in a state in which delivery of the hydrogen gas from the first compressor 22 to the accumulator 30 is stopped. In the following explanation, this operation mode is distinguished from the series differential pressure filling operation and referred to as "differential pressure filling operation". That is, the controller 58 is capable of executing an operation mode in which the lead-in side valve 34 is closed and the lead-out side valve 38 is opened.

The controller 58 of the gas supply device 10 is capable of switching the series differential pressure filling operation, the direct filling operation, and the differential pressure filling operation.

Figure 3:
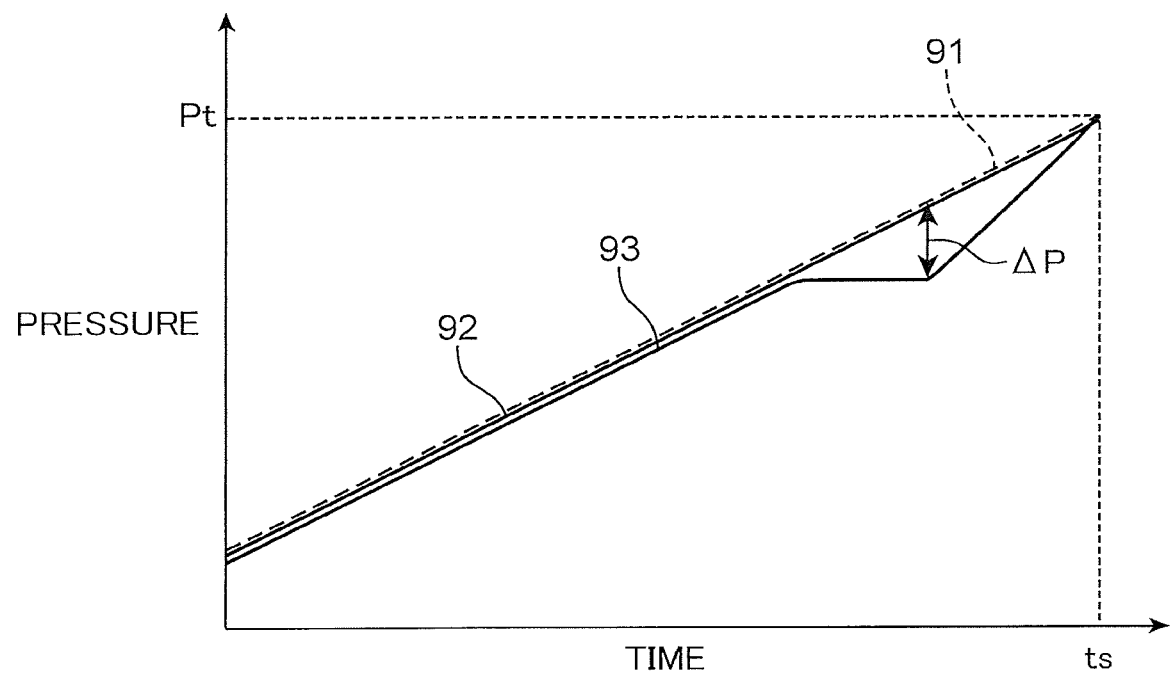
FIG. 3 is a diagram for explaining a transition of a gas pressure on a dispenser side during gas supply by the gas supply device.

FIG. 3 is a diagram illustrating a relation between the pressure of the hydrogen gas in the demand section and time. Straight lines 92 and 93 indicated by solid lines illustrate temporal transitions of the pressure of the hydrogen gas in the demand section. A straight line 91 indicated by a broken line indicates a temporal transition of a target pressure of the hydrogen gas. Note that, in FIG. 3, a start time of filling of hydrogen in the vehicle 14 is set as the origin. For convenience of illustration, portions where the tilts of the straight lines 91 to 93 are the same are vertically shifted and shown.

In the hydrogen station, the pressure of the hydrogen gas in the demand section is controlled to increase according to the target pressure indicated by the straight line 91 in FIG. 3. The pressure in the tank of the vehicle 14 reaches a final pressure Pt (e.g., 70 MPa) in a predetermined time ts (e.g., 3 minutes).

Figure 2:
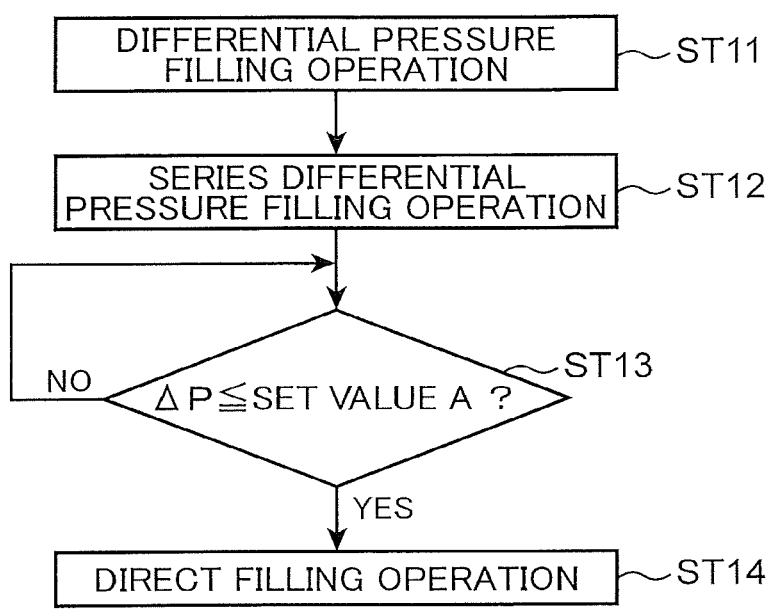
FIG. 2 is a diagram showing a flow for explaining a gas supply method by the gas supply device.

Operation control of the gas supply device 10 according to this embodiment is explained with reference to FIG. 2. The gas supply device 10 operates as explained below, whereby a gas supply method for supplying the hydrogen gas to the dispenser 12 is carried out. Note that storage work of the hydrogen gas in the storage tank 26 by the second compressor 24 is intermittently performed on the basis of the pressure of the hydrogen gas in the storage tank 26. In the following explanation, attention is directed to the operation of the devices further on the downstream side than the second compressor 24 and the storage tank 26 of the gas supply device 10.

Gas supply to the dispenser 12 is started when a gas supply command is issued from the dispenser 12 to the gas supply device 10. When the gas supply command is issued, first, the controller 58 starts the first compressor 22. The controller 58 closes the first on-off valve 41 and opens the return valve 46 until the first compressor 22 is brought into a standby state, that is, a state in which the hydrogen gas can be delivered to the lead-in line 18a of the gas flow passage 16. The hydrogen gas circulates between the first compressor 22 and the return channel 45 without being substantially compressed by the first compressor 22. The controller 58 of the gas supply device 10 opens the lead-out side valve 38 and the second on-off valve 42 and performs the differential pressure filling operation until the first compressor 22 is brought into the standby state (step ST11). Note that, at this point, the lead-in side valve 34 is closed. In the dispenser 12, the opening degree of the flow-rate control valve 53 is controlled such that a detection result of the second pressure sensor 54 reaches the target pressure. Therefore, the pressure of the hydrogen gas in the demand section gradually increases according to the target pressure indicated by the straight line 91 as indicated by the straight line 92 in FIG. 3.

When the first compressor 22 is brought into the standby state, the controller 58 opens the first on-off valve 41 and the lead-in side valve 34 of the lead-in line 18a and closes the return valve 46. Consequently, the operation of the gas supply device 10 shifts to the series differential pressure filling operation (step ST12). The first compressor 22 delivers the hydrogen gas to the lead-in line 18a of the gas flow passage 16. Note that the return valve 46 does not need to be completely closed. A flow rate of the hydrogen gas delivered from the first compressor 22 may be adjusted by adjusting an opening degree of the return valve 46.

When a part further on the downstream side than the first compressor 22 of the main channel 161 and the short-circuit passage 162 (hereinafter collectively referred to as "downstream section 161a") and the accumulator 30 are grasped as one system, in the series differential pressure filling operation, the hydrogen gas is supplied to the dispenser 12 according to a pressure difference between the system and the demand section. A flow rate of the hydrogen gas is controlled by the flow-rate control valve 53, whereby the pressure of the hydrogen gas in the demand section (see the straight line 92 in FIG. 3) gradually increases according to the target pressure.

In the series differential pressure filling operation, the controller 58 controls the number of revolutions of the first compressor 22 on the basis of a detection value of the first pressure sensor 48 such that the pressure of the hydrogen gas in the downstream section 161a and the accumulator 30 reaches the set pressure (e.g., 82 MPa). Note that data obtained by processing the detection value of the first pressure sensor 48 may be used for the control of the number of revolutions of the first compressor 22. Consequently, even if the differential pressure filling operation is performed beforehand, the pressure in the accumulator 30 quickly rises. The pressure in the downstream section 161a and the accumulator 30 is maintained fixed. However, when a flow rate of the hydrogen gas requested from the dispenser 12 (hereinafter referred to as "requested amount") exceeds an upper limit of a flow rate that can be delivered from the first compressor 22 (hereinafter referred to as "upper limit amount"), a difference between the requested amount and the upper limit amount is led out from the accumulator 30 to the dispenser 12. The pressure in the accumulator 30 and the downstream section 161a drops. In this way, the pressure of the hydrogen gas (in other words, an amount of the hydrogen gas) in the accumulator 30 increases or decreases according to a relation between the flow rate of the hydrogen gas delivered from the first compressor 22 and the requested amount requested by the dispenser 12.

When the pressure in the tank in the vehicle 14 reaches the final pressure Pt (see FIG. 3), the filling of the hydrogen gas from the dispenser 12 to the vehicle 14 is stopped. The supply of the hydrogen gas from the gas supply device 10 to the dispenser 12 is also stopped. Note that the direct filling operation explained below is performed depending on the size of the tank of the vehicle 14.

As explained above, the series differential pressure filling operation is performed in the gas supply device 10, whereby the drop of the pressure in the accumulator 30 is suppressed compared with when only the differential pressure filling operation is performed. Consequently, it is possible to reduce time required for raising the pressure in the accumulator 30 to the set pressure, a so-called recovery time. It is possible to quickly start filling of the hydrogen gas in the next vehicle 14.

Incidentally, as explained above, when the requested amount from the dispenser 12 exceeds the upper limit amount of the first compressor 22 halfway in the filling of the hydrogen gas in the vehicle 14, the pressure in the downstream section 161a and the accumulator 30 drops. In particular, in the case of the vehicle 14 having a large capacity of the tank, since a large amount of the hydrogen gas is necessary, the pressure in the downstream section 161a and the accumulator 30 greatly drops. In a state in which the pressure in the downstream section 161a and the accumulator 30 drops, when the pressure in the tank of the vehicle 14 rises to the vicinity of the final pressure (pressure at fully filled time), a pressure difference between the pressure in the downstream section 161a and the accumulator 30 and the pressure in the demand section becomes excessively small. Therefore, as indicated by the straight line 93 in FIG. 3, it is likely that the pressure of the hydrogen gas in the demand section greatly falls below the target pressure.

Therefore, if a difference ΔP (i.e., a pressure difference) between a detection value P1 of the first pressure sensor 48 and a detection value P2 of the second pressure sensor 54 is equal to or smaller than a set value A (step ST13), the controller 58 closes the lead-in side valve 34 while keeping the first on-off valve 41 and the second on-off valve 42 open and blocks the inflow of the hydrogen gas into the accumulator 30. Consequently, the operation of the gas supply device 10 shifts to the direct filling operation (step ST14). Consequently, the entire amount of the hydrogen gas is delivered from the first compressor 22 to the dispenser 12 via the short-circuit passage 162. The controller 58 controls the number of revolutions of the first compressor 22 such that the detection value of the second pressure sensor 54 reaches the target pressure. Therefore, the pressure of the hydrogen gas in the demand section increases according to the target pressure. Note that the control of the number of revolutions of the first compressor 22 may be performed by comparing the data obtained by processing the detection value of the second pressure sensor 54 with the target pressure.

When the pressure in the tank of the vehicle 14 reaches the final pressure Pt, the filling of the hydrogen gas from the dispenser 12 to the vehicle 14 is stopped.

The embodiment of the present invention is explained above. In the gas supply device 10, the first compressor 22 is connected to the accumulator 30 in series in the main channel 161. The lead-in side valve 34 and the lead-out side valve 38 are opened, whereby the hydrogen gas can be led in from the first compressor 22 to the accumulator 30 and the hydrogen gas can be lead out from the accumulator 30 to the dispenser 12. Consequently, it is possible to suppress a drop of the pressure in the accumulator 30 during the driving of the gas supply device 10 compared with the gas supply device that performs only the differential pressure filling operation. As a result, it is possible to reduce the recovery time of the accumulator 30. It is possible to quickly start the filling of the hydrogen gas in the next vehicle 14.

In the series differential pressure filling operation, the number of revolutions of the first compressor 22 is controlled on the basis of the detection result of the first pressure sensor 48 such that the pressure of the hydrogen gas in the downstream section 161a is maintained at the set pressure. Therefore, the drop of the pressure of the hydrogen gas in the downstream section 161a and the accumulator 30 is further suppressed. Further, the pressure in the downstream section 161a and the accumulator 30 located on the upstream side of the dispenser 12 is maintained fixed, whereby the control of the pressure (or the flow rate) of the hydrogen gas by the flow-rate control valve 53 is facilitated.

In this embodiment, the hydrogen gas is delivered from the accumulator 30 to the dispenser 12 before the first compressor 22 is brought into the standby state. Consequently, it is possible to quickly fill the hydrogen gas in the vehicle 14 carried into the hydrogen station.

Since the short-circuit passage 162 is provided in the gas flow passage 16, it is possible to easily switch the operation of the gas supply device 10 from the series differential pressure filling operation to the direct filling operation. In the direct filling operation, the number of revolutions of the first compressor 22 is controlled on the basis of the detection result of the second pressure sensor 54. Therefore, it is possible to increase the pressure of the hydrogen gas in the demand section according to the target pressure.

In the gas supply device 10, the hydrogen gas in the gas supply source 20 is compressed using the second compressor 24, which is the other compressor other than the first compressor 22. The compressed hydrogen gas is stored in the storage tank 26. The first compressor 22 uses the stored gas, whereby a compression ratio (i.e., a pressure ratio on the suction side and the discharge side) in the first compressor 22 can be suppressed. Therefore, it is possible to reduce the first compressor 22 in size.

In the gas supply device 10, in the shift from the series differential pressure filling operation to the direct filling operation, when a ratio (i.e., P1/P2) of the detection value P1 of the first pressure sensor 48 to the detection value P2 of the second pressure sensor 54 is equal to or smaller than a set value, the controller 58 may close the lead-in side valve 34 and block the flow of the hydrogen gas from the first compressor 22 to the accumulator 30. In this way, if the gas supply device 10 shifts to the direct filling operation on the basis of a pressure change between the first pressure sensor 48 and the second pressure sensor 54, opening and closing of the lead-in side valve 34 may be performed on the basis of various arithmetic operations.

Further, as another example of the opening and closing control of the lead-in side valve 34 in the shift from the series differential pressure filling operation to the direct filling operation, when the detection value P2 of the second pressure sensor 54 reaches a set value Pd, which is a value smaller than a target pressure Pm, the controller 58 may close the lead-in side valve 34 and block the flow of the hydrogen gas from the first compressor 22 to the accumulator 30. The controller 58 may perform the opening and the closing of the lead-in side valve 34 on the basis of whether a difference between the target pressure Pm and the detection value P2 reaches a set value. The controller 58 may perform the opening and the closing of the lead-in side valve 34 on the basis of a ratio of the detection value P2 to the target pressure Pm. In this way, if the gas supply device 10 shifts to the direct filling operation on the basis of the change in the detection value of the second pressure sensor 54 with respect to the target pressure Pm, the opening and the closing of the lead-in side valve 34 may be performed on the basis of various arithmetic operations.

Figure 4:
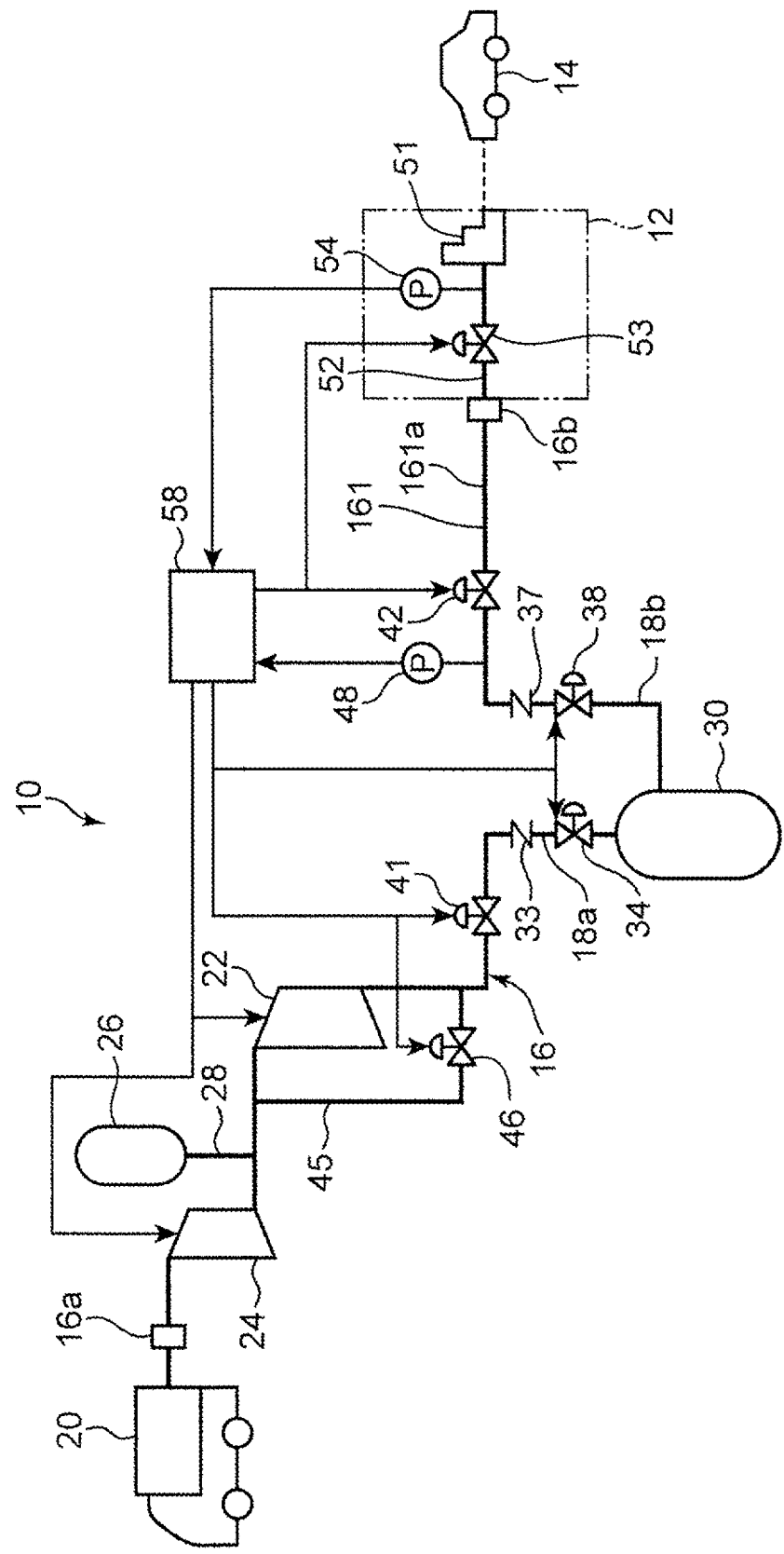
FIG. 4 is a diagram schematically showing the overall configuration of a gas supply device according to another example.

Note that the present invention is not limited to the embodiment. Various changes, improvements, and the like are possible in a range not departing from the spirit of the present invention. For example, as shown in FIG. 4, the short-circuit passage 162 may be omitted. Even in this case, since the first compressor 22 is connected to the accumulator 30 in series, the lead-in side valve 34 and the lead-out side valve 38 are opened. Consequently, it is possible to lead the hydrogen gas into the accumulator 30 and lead out the hydrogen gas from the accumulator 30 to the dispenser 12. It is possible to suppress the drop of the pressure in the accumulator 30 during the operation of the gas supply device 10.

In the embodiment, when the first compressor 22 is in the standby state at a point in time when the vehicle 14 is carried in, the differential pressure filling operation does not always need to be performed.

In the embodiment, the first pressure sensor 48 may be disposed in the downstream section 161a of the main channel 161, more specifically, between the first compressor 22 and the first on-off valve 41. In this case, pressure equivalent to the pressure in the accumulator 30 is measured by the first pressure sensor 48. The first pressure sensor 48 may be directly attached to the accumulator 30. In this case, the first pressure sensor 48 is configured to detect the pressure in the accumulator 30.

Figure 5:
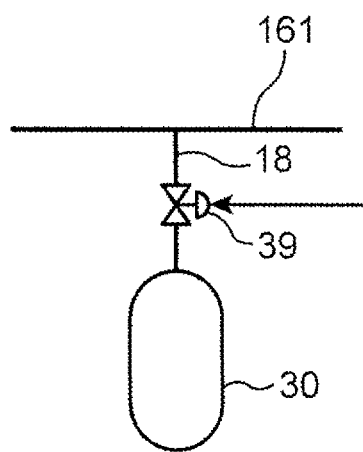
FIG. 5 is a diagram showing another example of the gas supply device.

As shown in FIG. 5, the lead-in line 18*a* and the lead-out line 18*b* may be configured by one pipe 18. In this case, a valve member 39 such as an on-off valve is provided in the pipe 18.

In this embodiment, the second compressor 24 and the storage tank 26 are provided. However, the second compressor 24 and the storage tank 26 may be omitted. The hydrogen gas may be directly sent from the gas supply source 20 to the first compressor 22. The gas supply device 10 may be used for filling the hydrogen gas in a tank mounting device other than the vehicle. The gas supply device may be used for supply of gas other than the hydrogen gas.

The embodiment is generally explained.

(1) In the embodiment, since the compressor is connected to the accumulator in series, it is possible to lead the gas into the accumulator and it is possible to lead out the gas from the accumulator to the filling equipment. Since the compressor supplies the gas, it is possible to suppress a drop of the pressure in the accumulator during the operation of the gas supply device. As a result, it is possible to reduce the recovery time of the accumulator. It is possible to quickly start filling of the gas in the next tank amounting device.

(2) The gas supply device may further include a pressure detecting section that detects the pressure in the accumulator or pressure equivalent to the pressure. In this case, when the compressor delivers the gas to the gas flow passage, the control device may control the number of revolutions of the compressor on the basis of a detection result of the pressure detecting section such that pressure of the gas is maintained at a predetermined pressure.

In this form, it is possible to further suppress the drop of the pressure in the accumulator. As a result, it is easier to control the supply of the gas from the filling equipment to the vehicle.

(3) The gas flow passage may include: a main channel including the lead-in line and the lead-out line and connecting the compressor, the accumulator, and the filling equipment; and a short-circuit passage that short-circuits the lead-in line and the lead-out line to enable sending of the gas from the compressor to the filling equipment not through the accumulator. Another pressure detecting section may be provided in the filling equipment. In this case, the control device may close the lead-in side valve on the basis of a pressure change between the pressure detecting section and the other pressure detecting section and control the number of revolutions of the compressor on the basis of a detection result of the other pressure detecting section.

In this form, in a state in which a gas inflow from the compressor to the accumulator is blocked, it is possible to directly perform the gas supply from the compressor to the filling equipment (the direct filling operation). Consequently, the entire amount of the gas delivered from the compressor is supplied to the filling equipment. A flow rate (or pressure) of the gas filled in the tank mounting device from the filling equipment is secured.

(4) The gas flow passage may include: a main channel including the lead-in line and the lead-out line and connecting the compressor, the accumulator, and the filling equipment; and a short-circuit passage that short-circuits the lead-in line and the lead-out line to enable sending of the gas from the compressor to the filling equipment not through the accumulator. Another pressure detecting section may be provided in the filling equipment. In this case, the control device may close the lead-in side valve on the basis of a change in a detection value of the other pressure detecting section with respect to a target pressure of the gas in the filling equipment and control the number of revolutions of the compressor on the basis of a detection result of the other pressure detecting section.

In this form, in a state in which a gas inflow from the compressor to the accumulator is blocked, it is possible to directly perform the gas supply from the compressor to the filling equipment (the direct filling operation). Consequently, the entire amount of the gas delivered from the compressor is supplied to the filling equipment. A flow rate (or pressure) of the gas filled in the tank mounting device from the filling equipment is secured.

(5) The control device may be configured to be capable of bringing the lead-in side valve into a closed state and bringing the lead-out side valve to an open state. In this form, it is possible to supply the gas to the filling equipment according to the differential pressure filling operation.

(6) The gas supply device may further include: another compressor that compresses gas of a gas supply source; and a storage tank that stores the gas discharged from the other compressor. In this case, the compressor may suck the gas in the storage tank.

In this form, the gas discharged from the other compressor is stored in the storage tank. The stored gas is compressed in the compressor. Consequently, it is possible to suppress a compression ratio in the compressor. Therefore, it is possible to reduce the compressor in size.

(7) The embodiment is a hydrogen station including: the gas supply device; and filling equipment connected to an outflow end of the gas supply device. The filling equipment fills hydrogen gas supplied from the gas supply device in the tank mounting device.

(8) The embodiment is a gas supply method by a gas supply device, the gas supply device including: a compressor that compresses gas; an accumulator disposed downstream of the compressor and supplying the gas to filling equipment that fills the gas in a tank mounting device; and a gas flow passage that connects the compressor, the accumulator, and the filling equipment. The gas supply method includes a step of leading the gas from the compressor into the accumulator and, at the same time, leading out the gas from the accumulator to the filling equipment.

In the embodiment, since the compressor is connected to the accumulator in series, it is possible to lead the gas into the accumulator and it is possible to lead out the gas from the accumulator to the filling equipment. Since the compressor supplies the gas, it is possible to suppress a drop of the pressure in the accumulator during the operation of the gas supply device. As a result, it is possible to reduce the recovery time of the accumulator. It is possible to quickly start filling of the gas in the next tank amounting device.

(9) The gas flow passage may include a pressure detecting section disposed downstream of the compressor. In this case, in the gas supply method, when the compressor delivers the gas to the gas flow passage, the number of revolutions of the compressor may be controlled on the basis of a detection result of the pressure detecting section such that pressure of the gas is maintained at a predetermined pressure.

In this form, it is possible to further suppress the drop of the pressure in the accumulator. As a result, it is easier to control the supply of the gas from the filling equipment to the vehicle.

(10) In the gas supply method, the flow of the gas from the compressor to the accumulator may be blocked on the basis of a pressure change between the pressure detecting section and another pressure detecting section provided in the filling equipment. The number of revolutions of the compressor may be controlled on the basis of a detection result of the other pressure detecting section. The gas may be sent from the compressor to the filling equipment not through the accumulator.

In this form, in a state in which a gas inflow from the compressor to the accumulator is blocked, it is possible to directly perform the gas supply from the compressor to the filling equipment (the direct filling operation). Consequently, the entire amount of the gas delivered from the compressor is supplied to the filling equipment. A flow rate (or pressure) of the gas filled in the tank mounting device from the filling equipment is secured.

(11) In the gas supply method, a flow of the gas from the compressor to the accumulator may be blocked on the basis of a change in a detection value of another pressure detecting section provided in the filling equipment with respect to a target pressure of the gas in the filling equipment. In this case, the number of revolutions of the compressor may be controlled on the basis of a detection result of the other pressure detecting section and the gas may be sent from the compressor to the filling equipment not through the accumulator.

(12) In the gas supply method, the gas may be delivered from the accumulator to the filling equipment before the compressor is brought into a state in which the gas can be delivered to the lead-in line. In this form, it is possible to quickly supply the gas to the filling equipment.

(13) In the gas supply method, the gas supply device may further include: another compressor that compresses gas of a gas supply source; and a storage tank that stores the gas discharged from the other compressor. In this case, the compressor may suck the gas in the storage tank.

As explained above, according to the embodiment, it is possible to suppress the gas pressure in the accumulator from dropping.

The invention claimed is:

1. A gas supply device for supplying gas to a filling equipment for filling gas in a tank carried by a vehicle, the gas supply device comprising:
   a first compressor connected with a gas supply source for compressing gas supplied from the gas supply source;
   an accumulator for receiving the gas from the first compressor to accumulate and supply the gas to the filling equipment;
   a gas flow passage that connects the first compressor, the accumulator, and the filling equipment with one another, the gas flow passage including:
      a first line connecting the first compressor and the filling equipment with each other; and
      a second line connecting the first line and the accumulator with each other;
   a first valve provided on the first line and between the first compressor and the accumulator;
   a second valve provided on the first line and between the accumulator and the filling equipment;
   a third valve provided on the second line;
   the first valve being arranged upstream of the third valve, and the second valve being arranged downstream of the third valve;
   a first pressure detecting section provided on the first line of the gas flow passage; and
   a controller configured to communicate with the first pressure detecting section, the first compressor, and the first to third valves to perform based on a detection of the first pressure detecting section:
      a differential pressure filling operation of supplying the gas from the accumulator to the filling equipment according to a pressure difference between a gas pressure in the accumulator and a gas pressure in the filling equipment;
      a series differential pressure filling operation of supplying the gas from the first compressor to the accumulator, and from the accumulator to the filling equipment according to the pressure difference between the gas pressure in the accumulator and the gas pressure in the filling equipment; and
      a direct filling operation of supplying the gas from the first compressor to the filling equipment.

2. The gas supply device according to claim 1, wherein, the second line includes:
   a lead-in line for leading the gas from the first compressor into the accumulator; and
   a lead-out line for leading out the gas from the accumulator to the filling equipment,
   the third valve includes:
   a lead-in side valve provided in the lead-in line; and
   a lead-out side valve provided in the lead-out line, and
   the controller controls opening and closing of the lead-in side valve and the lead-out side valve to open the lead-in side valve and the lead-out side valve to perform the series differential pressure filling operation.

3. The gas supply device according to claim 2, wherein when the series differential pressure filing operation is performed, the controller controls a number of revolutions of the first compressor based on a detection result of the first pressure detecting section to maintain a pressure of the gas in the accumulator or at a downstream of the accumulator at a predetermined pressure to fill the gas in the tank.

4. A hydrogen station comprising:
   the gas supply device according to claim 3; and
   the filling equipment connected to an outflow end of the gas flow passage of the gas supply device, wherein
   the filling equipment fills hydrogen gas supplied from the gas supply device in a tank carried by a vehicle.

5. The gas supply device according to claim 3, further comprising:
   a second pressure detecting section provided in the filling equipment; and
   the controller controls the lead-in side valve and the lead-out side valve based on a pressure change between the first pressure detecting section and the second pressure detecting section to close the lead-in side valve and the lead-out side valve, and controls the number of revolutions of the first compressor based on a detection result of the second pressure detecting section to perform the direct filling operation.

6. A hydrogen station comprising:
   the gas supply device according to claim 5; and
   the filling equipment connected to an outflow end of the gas flow passage of the gas supply device, wherein
   the filling equipment fills hydrogen gas supplied from the gas supply device in a tank carried by a vehicle.

7. The gas supply device according to claim 3, further comprising:
   a second pressure detecting section provided in the filling equipment; and
   the controller controls the lead-in side valve and the lead-out side valve based on a change in a detection value of the second pressure detecting section with respect to a target pressure of the gas in the filling equipment to close the lead-in side valve and the lead-out side valve, and controls the number of revolutions of the first compressor on a detection result of the second pressure detecting section to perform the direct filling operation.

8. A hydrogen station comprising:
the gas supply device according to claim 7; and
the filling equipment connected to an outflow end of the gas flow passage of the gas supply device, wherein
the filling equipment fills hydrogen gas supplied from the gas supply device in a tank carried by a vehicle.

9. The gas supply device according to claim 2, wherein the controller controls the lead-in side valve and the lead-out side valve to close the lead-in side valve and open the lead-out side valve to perform the differential pressure filling operation.

10. A hydrogen station comprising:
the gas supply device according to claim 9; and
the filling equipment connected to an outflow end of the gas flow passage of the gas supply device, wherein
the filling equipment fills hydrogen gas supplied from the gas supply device in a tank carried by a vehicle.

11. The gas supply device according to claim 2, further comprising:

a second compressor provided between the first compressor of the gas supply source; and
a storage tank that stores the gas discharged from the second compressor, wherein
the first compressor sucks the gas in the storage tank.

12. A hydrogen station comprising:
the gas supply device according to claim 11; and
the filling equipment connected to an outflow end of the gas flow passage of the gas supply device, wherein
the filling equipment fills hydrogen gas supplied from the gas supply device in a tank carried by a vehicle.

13. A hydrogen station comprising:
the gas supply device according to claim 2; and
the filling equipment connected to an outflow end of the gas flow passage of the gas supply device, wherein
the filling equipment fills hydrogen gas supplied from the gas supply device in a tank carried by a vehicle.

14. A hydrogen station comprising:
the gas supply device according to claim 1; and
the filling equipment connected to an outflow end of the gas flow passage of the gas supply device, wherein
the filling equipment fills hydrogen gas supplied from the gas supply device in a tank carried by a vehicle.

* * * * *